US010478856B2

(12) United States Patent
Xu et al.

(10) Patent No.: US 10,478,856 B2
(45) Date of Patent: Nov. 19, 2019

(54) LINEAR VIBRATION MOTOR

(71) Applicant: AAC Technologies Pte. Ltd., Singapore (SG)

(72) Inventors: Hongfu Xu, Shenzhen (CN); Jinquan Huang, Shenzhen (CN); Fanghua Ling, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 384 days.

(21) Appl. No.: 15/652,714

(22) Filed: Jul. 18, 2017

(65) Prior Publication Data

US 2018/0297071 A1 Oct. 18, 2018

(30) Foreign Application Priority Data

Apr. 14, 2017 (CN) .................... 2017 2 0398016 U

(51) Int. Cl.
*H02K 33/00* (2006.01)
*B06B 1/04* (2006.01)

(52) U.S. Cl.
CPC ............. *B06B 1/045* (2013.01); *H02K 33/00* (2013.01)

(58) Field of Classification Search
CPC .................... H02K 33/00–35/06; B06B 1/045
See application file for complete search history.

(56) References Cited

U.S. PATENT DOCUMENTS

2012/0169151 A1* 7/2012 Dong .................... H02K 33/16 310/25
2017/0033657 A1* 2/2017 Mao ...................... H02K 33/16

* cited by examiner

*Primary Examiner* — Ramon M Barrera
(74) *Attorney, Agent, or Firm* — IPro, PLLC; Na Xu

(57) ABSTRACT

The present disclosure provides a linear vibration motor, including: a base, a vibrating unit and an elastic member. The elastic member comprises a first elastic member and a second elastic member. The first elastic member comprises a first fixing arm, two first elastic arms respectively extending from the first fixing arm, two first connecting arms respectively extending from the two first elastic arms, and two first avoiding holes penetrating through the first fixing arm; the second elastic member comprises a second fixing arm, two second elastic arms respectively extending from the second fixing arm, and two second connecting arms respectively extending from the two second elastic arms, the first avoiding holes are respectively arranged directly facing the two second connecting arms. Comparing with the prior art, the linear vibration motor of the present disclosure can be conveniently assembled, and has good vibration property and high reliability.

9 Claims, 4 Drawing Sheets

100
1
12
13
6
3
5
31
3
32
5
6
212
2
21
211
71
711
712
22
4
7
11

LINEAR VIBRATION MOTOR

TECHNICAL FIELD

The present disclosure relates to a motor and, particularly, relates to a linear vibration motor used in the field of mobile electronic products.

BACKGROUND

With the development of electronic technologies, portable consumption electronic product is becoming more and more popular, such as cellphone, handheld game player, navigation device or handheld multimedia entertainment device and the like. Generally, these electronic products will use a linear vibration motor for system feedback, such as call prompt, message prompt, navigation prompt of a cellphone, vibration feedback of a game player etc. Such widespread application requires the vibration motor to possess high performance and long service life.

The linear vibration motor in the prior art includes a base having accommodating space, a vibrating unit located in the accommodating space, an elastic member which fixes and suspends the vibrating unit in the accommodating space, and a coil fixed on the base. The magnetic field generated by the coil and the magnetic field generated by the vibrating unit interact with each other, so as to drive the vibrating unit to move reciprocally and linearly to generate vibration.

In order to increase elasticity of the elastic member, the linear vibration motor adopts two staggered elastic members which respectively clamp the vibrating unit. Each elastic member includes a fixing arm fixed on the base, two elastic arms bending and extending from two ends of the fixing arm respectively and surrounding the vibrating unit, and two connecting arms bending and extending from ends of two elastic arms respectively and surrounding the vibrating unit, the connecting arms are fixed on the vibrating unit.

However, the two elastic members are oppositely arranged, after one elastic member is welded to the vibrating unit, when the other elastic member is being welded to the vibrating unit, since the fixing arm of the welded elastic member blocks the connecting arm of another elastic member to be welded, resulting in that the connecting arm cannot be tightly fitted with the vibrating unit, thereby leading to risks of poor welding.

Therefore, a new linear vibration motor is necessary to solve the above-mentioned problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated as follows with reference to the drawings and embodiments.

Figure 1:
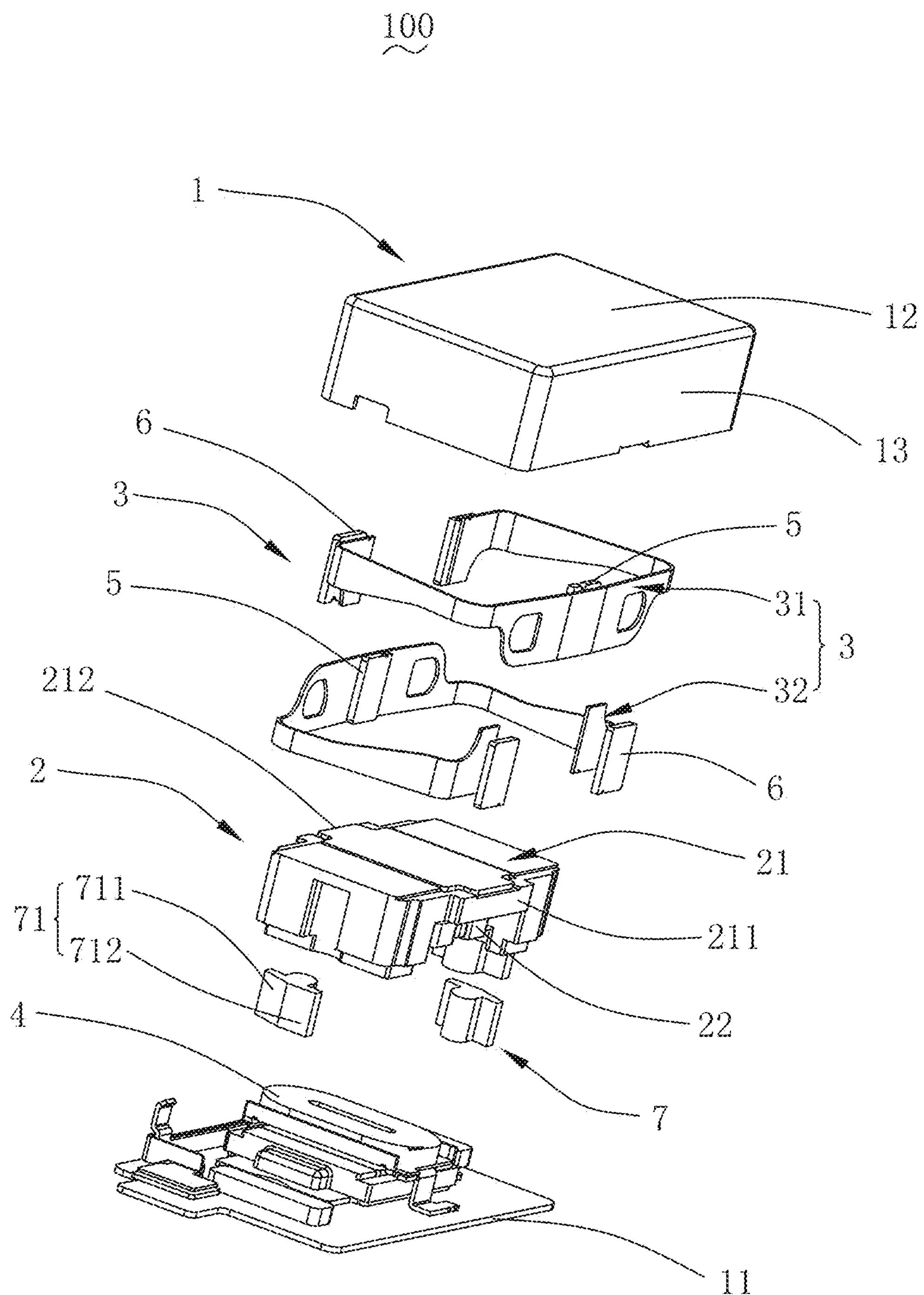
FIG. 1 is exploded perspective structural diagram of a linear vibration motor in accordance with an exemplary embodiment of the present disclosure.
Figure 2:
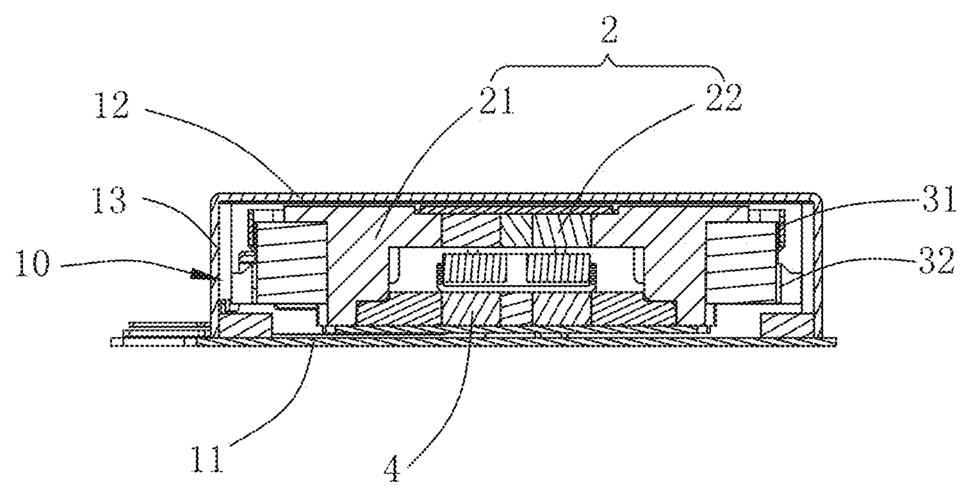
FIG. 2 is sectional view of a linear vibration motor in accordance with an exemplary embodiment of the present disclosure.

Please refer to FIG. 1 and FIG. 2 at the same time, the present disclosure provides a linear vibration motor 100, including a base 1 having accommodating space 10, a vibrating unit 2 located in the accommodating space 10, an elastic member 3 fixing and suspending the vibrating unit 2 in the accommodating space 10, a coil 4 fixed on the base 1 and driving the vibrating unit 2 to vibrate, a first block 5, a second block 6 and a limiting lug 7.

The base 1 includes a bottom plate 11, a top plate 12 arranged opposite to the bottom plate 11, and a side plate 13 connecting the bottom plate 11 with the top plate 12. The bottom plate 11, the top plate 12 and the side plate 13 together define the accommodating space 10.

In an exemplary embodiment, the base 1 is of a rectangular shape, therefore, there are four side plates 13.

The vibrating unit 2 includes a weight 21 and a magnet 22 embedded in the weight 21. The vibrating unit 2 includes a first side wall 211 and a second side wall 212 oppositely arranged along a direction perpendicular to the vibrating direction of the vibrating unit 2, and the first side wall 211 and the second side wall 212 are located at two opposite sides of the weight 21.

Figure 3:
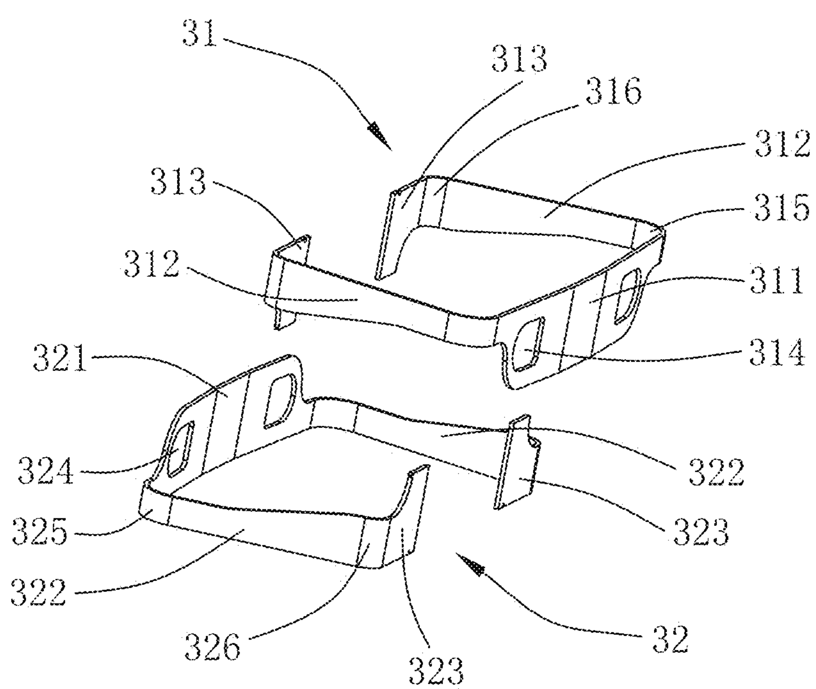
FIG. 3 is perspective structural diagram of an elastic member of a linear vibration motor in accordance with an exemplary embodiment of the present disclosure.
Figure 4:
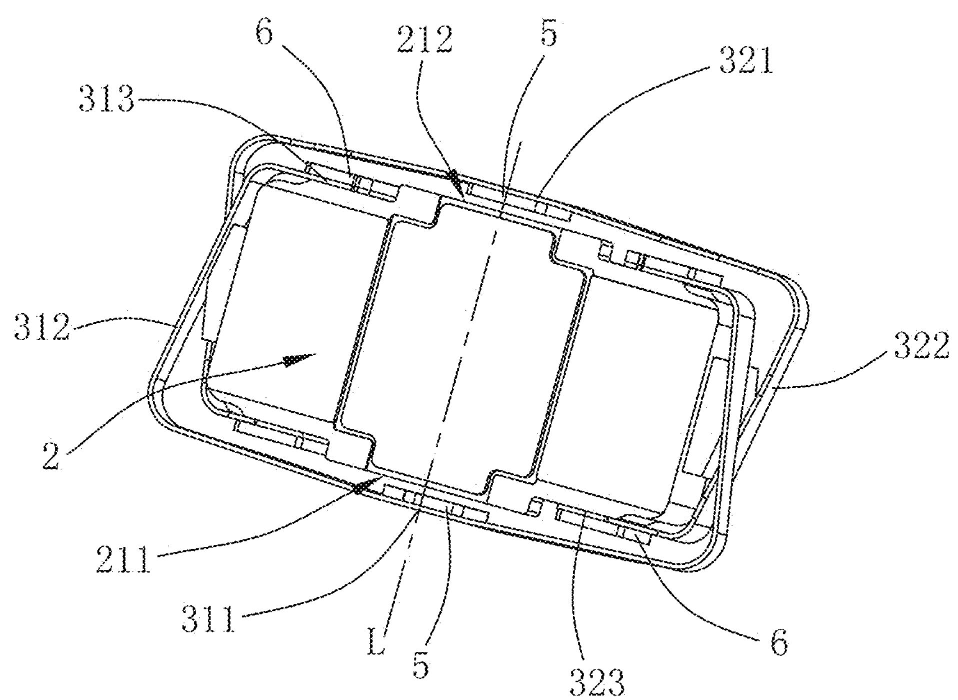
FIG. 4 is structural schematic diagram of assembly of a vibrating unit and an elastic member of a linear vibration motor in accordance with an exemplary embodiment of the present disclosure.

Please refer to FIG. 3 and FIG. 4, the elastic member 3 includes a first elastic member 31 and a second elastic member 32 which are spaced from each other. The arrangement of double elastic members can improve the vibrating effect of the linear vibration motor 100, and improve reliability.

In an exemplary embodiment, the first elastic member 31 and the second elastic member 32 have a same structure, when assembling, they provide space for each other and cooperate in opposite directions, the assembling manners is illustrated as follows:

The first elastic member 31 includes a first fixing arm 311 fixed on the base 1 and spaced from the first side wall 211, two first elastic arms 312 respectively extending from two ends of the first fixing arm 311 and surrounding the vibrating unit 2, two first connecting arms 313 respectively extending from ends of two first elastic arms 312 and surrounding the vibrating unit 2, and two first avoiding holes 314 penetrating through the first fixing arm 311.

The first fixing arm 311 is fixed on the side plate 13 of the base 1, in the present embodiment, the first fixing arm 311 is fixed on a side plate close to the first side wall 211.

The first elastic arm 312 is suspended in the accommodating space 10, configured to provide elastic restoring force.

The two first connecting arms 313 are respectively fixed on the second side wall 212, so that the vibrating unit 2 is suspended in the accommodating space 10.

The second elastic member 32 includes a second fixing arm 321 fixed on the base 1 and arranged opposite to and spaced from the second side wall 212, two second elastic arms 322 respectively bending and extending from two ends of the second fixing arm 321 and surrounding the vibrating unit 2, two second connecting arms 323 respectively bending and extending from ends of two second elastic arms 322 and surrounding the vibrating unit 2, and two second avoiding holes 324 penetrating through the second fixing arm 321.

The second fixing arm 321 is fixed on the side plate 13 of the base 1, in the present embodiment, the second fixing arm 321 is fixed on a side plate close to the first side wall 212.

The second elastic arm 322 is suspended in the accommodating space 10, configured to provide elastic restoring force.

The two second connecting arms 323 are respectively fixed on the first side wall 211, and are located between the first side wall 211 and the first fixing arm 311, and the two second connecting arms 323 are spaced from the first fixing arm 311. The first connecting arm 313 is correspondingly located between the second side wall 212 and the second fixing arm 321, and the first connecting arm 313 is spaced from the second fixing arm 321.

In addition, when assembling, referring to FIG. 4, the first elastic arm 312 and the second elastic arm 322 provide space for each other, so as to avoid mutual interference between the first elastic arm 312 and the second elastic arm 322. Specifically, in the present embodiment, an area of a cross section of the first elastic arm 312 is gradually increasing from the first side wall 211 in a direction toward the second side wall 212, and an area of a cross section of the second elastic arm 322 is gradually increasing from the second side wall 212 in a direction toward the first side wall 211. Therefore, when installing two elastic members on the weight 21, the first elastic arm 312 will not interfere with the second elastic arm 322, so that the vibrating unit 2 can vibrate more stable under the support of two elastic members.

Obviously, in other embodiments, the area of the cross section of the first elastic arm 312 and of the second elastic arm 322 may not change, as long as the two elastic arms will not interfere with each other in the thickness direction Z.

In an exemplary embodiment, the first avoiding holes 314 are respectively arranged directly facing the two second connecting arms 323, then a pressing component (not shown) can be easily inserted into the first avoiding hole 314, so that the second connecting arm 323 can be fitted with the first side wall 211 through the force of the pressing component and thus welded. The second avoiding holes 324 are respectively arranged directly facing the two first connecting arms 313, then a pressing component (not shown) can be easily inserted into the second avoiding hole 324, so that the first connecting arm 313 can be fitted with the second side wall 212 through the force of the pressing component and thus welded. Therefore, the arrangement of the first avoiding holes 314 and the second avoiding holes 324 simplifies the assembling of the first elastic member 31 and the second elastic member 32, the welding strength is large, the welding quality is good, and thus performs good reliability, so as to avoid situations of poor welding in the prior art.

Referring to FIG. 4, the first elastic member 31 and the second elastic member 32 are both structured in axial symmetry, which are symmetrically arranged with respect to a central axis L passing through a geometrical center of the first fixing arm 311/the second fixing arm 321 and being perpendicular to the vibrating direction of the vibrating unit 2, so as to further simplify the manufacturing of the first elastic member 31 and the second elastic member 32.

Therefore, the above-mentioned structure allows the first elastic member 31 and the second elastic member 32 to form an assembling structure by cooperating in opposite directions. The first elastic arm 312 and the second elastic arm 322 provide space for each other, so that the first elastic member 31 and the second elastic member 32 are spaced from each other and not intersected in space, so as to form a stacking structure in opposite directions during assembling, thus the assembling is simple with high efficiency.

Further, in an exemplary embodiment, in order to allow the first elastic member 31 and the second elastic member 32 to be bended for a sufficient amplitude when respectively extending and surrounding the vibrating unit 2, and to generate a larger elasticity, the first elastic member 31 further includes a first bending portion 315 connecting the first fixing arm 311 with the first elastic arm 312, and a second bending portion 316 connecting the first connecting arm 313 and the first elastic 312; and the second elastic member 32 further includes a third bending portion 325 connecting the second fixing arm 321 with the second elastic arm 322, and a fourth bending portion 326 connecting the second connecting arm 323 with the second elastic arm 322.

The coil 4 is fixed on the bottom plate 11, and is arranged directly facing the magnet and spaced therefrom. The magnetic field formed by the coil 4 after being energized and the magnetic field of the magnet 22 interact with each other, so as to drive the vibrating unit 2 to move reciprocally and linearly, thereby generating vibration.

The first block 5 is fixed at a side of the first fixing arm close to the first side wall and/or fixed at a side of the second fixing arm close to the second side wall. The arrangement of the first block 5, in one aspect, can respectively improve the fixing strength of the first fixing arm 311 and the second fixing arm 321 with the side plate 13 of the base 1, and prevent the elastic member 3 from dropping off from the base 1 and, in the other aspect, can avoid a direct collision of the elastic member with the base 1.

A plurality of the second blocks 6 is provided, specifically, in an exemplary embodiment, four second blocks 6 are provided. The second blocks 6 are fixed at a side of the first connecting arm 313 and the second connecting arm 323 close to the base. The arrangement of the second block 6, in one aspect, improves fixing strength of the elastic member 3 and the vibrating unit 2, so as to improve stability and, in the other aspect, prevents a direct collision of the weight 21 with the elastic member.

Two limiting lugs 7 are provided, which are formed by respectively protruding and extending from two opposite sides of the vibrating unit 2 which are spaced from each other along the vibrating direction. The first elastic arm 312 and the second elastic arm 322 located at a same side of the vibrating unit 2 abut with the same limiting lug 7 at the same time when the vibrating unit 2 is not vibrating.

Specifically, the limiting lug 7 includes an abutting surface 71 located far away from a side of the vibrating unit 2, and the arriving surface 71 includes a first abutting surface 711 and a second abutting surface 712 which are connected with each other and forms an included angle. The included angle of the first abutting surface 711 and the second abutting surface 712 is preferred to be an obtuse angle. The first elastic arm 312 abuts with the first abutting surface 711, the second elastic arm 322 abuts with the second abutting surface 712. The arrangement of the limiting lug 7 can avoid, when the amplitude of the vibrating unit 2 is excessively large, malfunctioning of the linear vibration motor 100 due to fracture of the first elastic arm 312 and/or the second elastic arm 322, so as to improve stability and reliability thereof. The limiting lug 7 preferably adopts a damping material, for example, a limiting lug made of rubber and the like.

Comparing with the prior art, the first elastic member and the second elastic member of the linear vibration motor in accordance with the present disclosure are respectively arranged by surrounding the vibrating unit, they are spaced and staggered from each other, so as to suspend the vibrating unit at the base. Such a structure extremely maximizes the total length of the elastic member, and improves the elastic performance, so as to improve the vibration of the linear vibration motor. The first elastic member and the second elastic member are respectively provided with first avoiding holes arranged directly facing the second connecting arm and second avoiding holes arranged directly facing the first connecting arm, so that the first elastic member and the second elastic member can respectively press the first connecting arm and the second connecting arm by way of, for example, a pressing component and the like through the second avoiding holes and the first avoiding holes, so that the first connecting arm and the second connecting arm can be tightly fitted to the vibrating unit. The assembly is simple and the welding is firm, thus the linear vibration motor performs good vibrating performance and a high reliability.

The above are only embodiments of the present disclosure, which will not limit the scope of the present disclosure, any equivalent structure or equivalent process transformation made according to the claim and drawings of the present disclosure, or directly or indirectly usage in other relevant technical fields, shall be included in the protection scope of the present disclosure.

What is claimed is:

1. A linear vibration motor, comprising:

a base having accommodating space;

a vibrating unit located in the accommodating space; and an elastic member suspending the vibrating unit in the accommodating space;

wherein the vibrating unit comprises a first side wall and a second side wall oppositely arranged along a direction perpendicular to a vibrating direction of the vibrating unit, the elastic member comprises a first elastic member and a second elastic member which are spaced from each other, wherein the first elastic member comprises a first fixing arm fixed on the base and arranged opposite to and spaced from the first side wall, two first elastic arms respectively extending from two ends of the first fixing arm and surrounding the vibrating unit, and two first connecting arms respectively extending from ends of two first elastic arms and surrounding the vibrating unit, wherein the two first connecting arms are respectively fixed on the second side wall;

wherein the second elastic member comprises a second fixing arm fixed on the base and arranged opposite to and spaced from the second side wall, two second elastic arms respectively bending and extending from two ends of the second fixing arm and surrounding the vibrating unit, and two second connecting arms respectively bending and extending from ends of two second elastic arms and surrounding the vibrating unit; wherein two second connecting arms are respectively fixed on the first side wall, and are located between the first side wall and the first fixing arm;

wherein the first elastic member further comprises two first avoiding holes penetrating through the first fixing arm; each of the first avoiding holes is respectively arranged directly facing a corresponding second connecting arm.

2. The linear vibration motor as described in claim 1, wherein the second elastic member further comprises two second avoiding holes penetrating through the second fixing arm, each of the second avoiding holes is respectively arranged directly facing a corresponding first connecting arm.

3. The linear vibration motor as described in claim 1, wherein the first elastic member further comprises a first bending portion connecting the first fixing arm with the first elastic arm, and a second bending portion connecting the first connecting arm with the first elastic arm; and the second elastic member further comprises a third bending portion connecting the second fixing arm with the second elastic arm, and a fourth bending portion connecting the second connecting arm with the second elastic arm.

4. The linear vibration motor as described in claim 1, wherein an area of a cross section of the first elastic arm gradually increases from the first side in a direction toward the second side wall; an area of a cross section of the second elastic arm gradually increases from the second side wall in a direction toward the first side wall.

5. The linear vibration motor as described in claim 2, wherein the linear vibration motor further comprises a first block fixed at a side of the first fixing arm close to the first side wall and/or fixed at a side of the second fixing arm close to the second side wall.

6. The linear vibration motor as described in claim 2, wherein the linear vibration motor further comprises a second block fixed at a side of the first fixing arm and a side of the second connecting arm close to the base.

7. The linear vibration motor as described in claim 1, wherein the linear vibration motor further comprises a limiting lug, the limiting lug protrudes and extends from two opposite sides of the vibrating unit which are spaced from each other along the vibrating direction; the first elastic arm and the second elastic arm located at a same side of the vibrating unit abut with the same limiting lug at the same time when the vibrating unit is not vibrating.

8. The linear vibration motor as describe in claim 7, wherein the limiting lug further comprises an abutting surface located at a side thereof away from the vibrating unit; the abutting surface comprises a first abutting surface and a second abutting surface which are connected with each other and forms an included angle; the first elastic arm abuts with the first abutting surface, and the second elastic arm abuts with the second abutting surface.

9. The vibration motor as described in claim 7, wherein the limiting lug is made of a damping material.

* * * * *